United States Patent [19]

Dibble et al.

[11] Patent Number: 5,391,355
[45] Date of Patent: Feb. 21, 1995

[54] VESSEL FOR THE TREATMENT OF PARTICULATE MATERIALS

[75] Inventors: Merton L. Dibble, Kingsport; Paul K. Scherrer, Johnson City, both of Tenn.

[73] Assignee: Eastman Chemical Company, Kingsport, Tenn.

[21] Appl. No.: 95,644

[22] Filed: Jul. 21, 1993

[51] Int. Cl.⁶ ............................ C08F 2/00; B01J 8/08; C08G 2/00
[52] U.S. Cl. .................................. 422/131; 422/138; 422/212; 422/213; 422/216; 422/220
[58] Field of Search ............... 422/131, 138, 141, 139, 422/195, 212, 213, 216, 220; 528/272, 308.5, 481, 483

[56] References Cited

U.S. PATENT DOCUMENTS

| | | | |
|---|---|---|---|
| 2,684,929 | 7/1954 | Schutte | 422/216 X |
| 2,851,401 | 9/1958 | Payne | 422/216 X |
| 3,083,471 | 4/1963 | Huntington | 422/216 X |
| 3,405,098 | 10/1968 | Heighton et al. | 528/308.5 |
| 3,544,525 | 12/1970 | Balint et al. | 528/483 |
| 3,756,990 | 9/1973 | Jaeger et al. | 528/481 |
| 3,960,817 | 6/1976 | Morawetz et al. | 528/272 |
| 4,064,112 | 12/1977 | Rothe et al. | 528/272 |
| 4,201,695 | 5/1980 | Jüntgen et al. | 252/411 R |
| 4,231,991 | 11/1980 | Müller | 422/245 |
| 4,276,261 | 6/1981 | Kerscher et al. | 422/131 |
| 4,959,198 | 9/1990 | Koves | 422/220 |
| 5,199,184 | 4/1993 | Rosse | 34/10 |

*Primary Examiner*—Robert J. Warden
*Assistant Examiner*—Christopher Y. Kim
*Attorney, Agent, or Firm*—John F. Stevens; Harry J. Gwinnell

[57] ABSTRACT

Disclosed is a substantially vertically disposed vessel for the continuous gravity plug flow of solid particles and countercurrent flow of fluid, the improvement comprising the vessel having at least one fluid inlet and a fluid distributing member communicating therewith and extending therefrom for the introduction of fluid into the vessel, the fluid distributor being of a generally inverted V-shape to provide for the substantially uninterrupted mass plug flow of particles past said distributor and discharge of gas out the bottom.

4 Claims, 3 Drawing Sheets

VESSEL FOR THE TREATMENT OF PARTICULATE MATERIALS

TECHNICAL FIELD

The present invention relates generally to a vessel for the treatment of particulate materials in which particles move continuously by gravity in plug flow through the vessel, and are contacted by fluid flowing countercurrent thereto. The vessel according to this invention is especially useful for the solid state polymerization of polyester. It is also useful as a heat exchanger between solid particles and a fluid.

BACKGROUND OF THE INVENTION

Although the present invention is useful in various processes in which a continuous plug, gravity flow of particles is to be contacted by a fluid, it has particular application in the solid state polymerization of polyester, in which the polyester is first formed to a low molecular weight in a melt phase, is solidified, formed into particles, and further polymerized in the solid state to a higher molecular weight.

Many reactor designs employ internal diffusers for introduction of inert gas. These diffusers along with their supports are expensive and may interfere with the uniform flow of pellets through the reactor. In addition, the structural integrity of internal diffusers and supports cannot be guaranteed without a proper understanding of mass flow of solids.

Reactors may also use a sparge ring around the circumference of the vessel either by itself or in combination with internal diffusers. While a sparge ring may avoid interference with pellet flow, it may be expensive to fabricate and if not properly designed offers a place for fines to collect.

U.S. Patents relating to the solid state polymerization of polyester, and reactors for conducting the polymerization, include U.S. Pat. Nos. 4,276,261; 3,405,098; 4,064,112; 3,960,817; 3,544,525 and 3,756,990.

DESCRIPTION OF THE INVENTION

Figure 1:
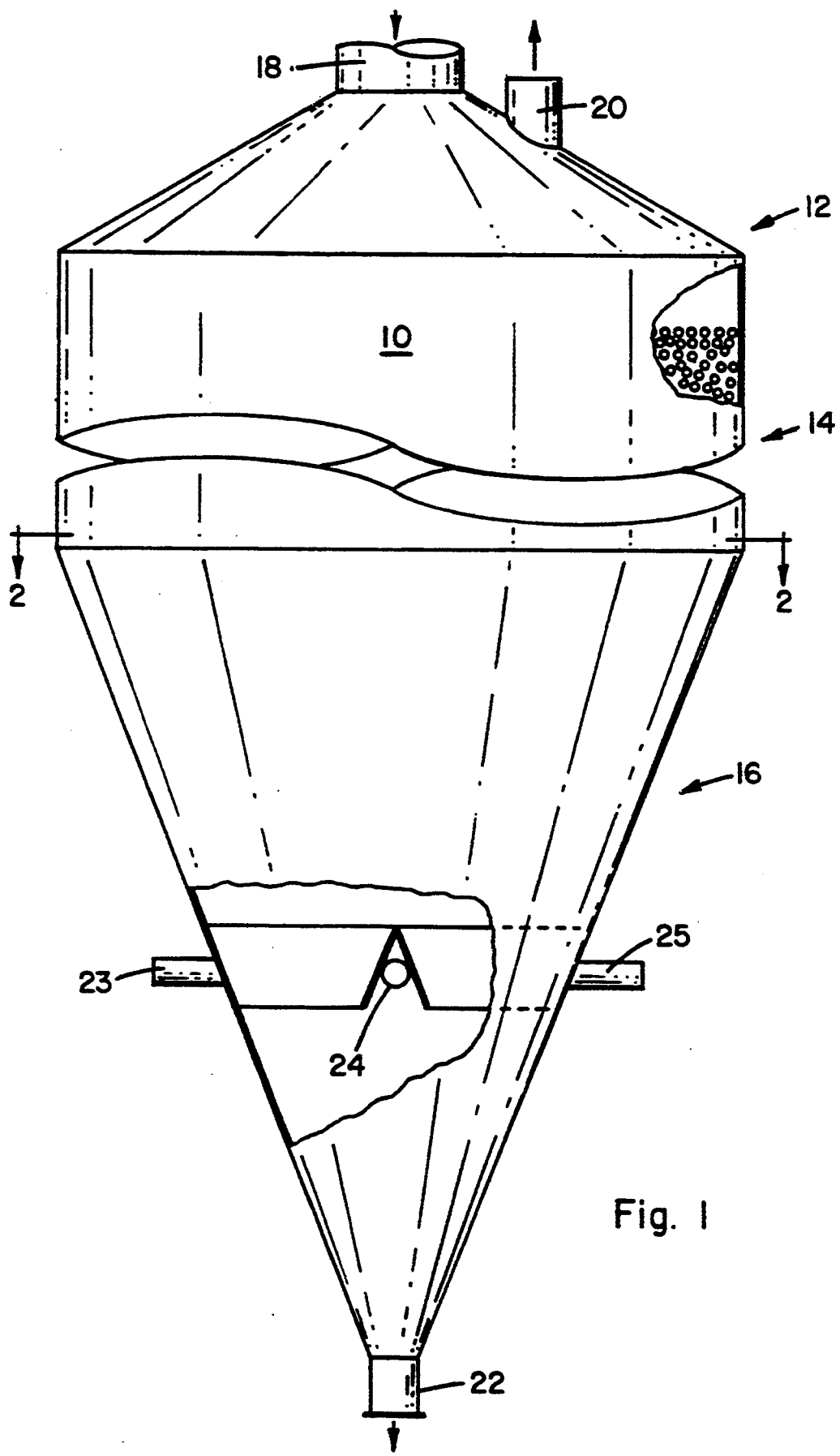
FIG. 1 is an elevation view of a vessel according to the present invention, partially cutaway to show the fluid distributing member according to the present invention.

Referring to FIG. 1, the vertically disposed vessel 10 comprises a top section indicated generally at 12, an intermediate, generally tubular section 14 and a converging bottom section 16, all of the sections merging together for the continuous gravity plug flow of particles downwardly and the upward countercurrent flow of fluid. The top section 12 is provided with at least one particle inlet 18 for the particulate material and at least one fluid outlet 20. In a vertically disposed vessel in accordance with this invention, the inlet 18 for the particulate material is at substantially the uppermost part and the outlet 22 for the particulate material is at substantially the lowermost part. The centerline extending through the vessel from the inlet to the outlet is preferably substantially vertical. The bottom section 16 is provided with a particle outlet 22. The vessel has at least one fluid inlet 23, 24, and 25. Also, the top section 12 may be provided with particle distribution devices (not shown) known in the art to distribute the incoming particulate material. Preferably, the inlet 18 and outlet 22 for particulate material will be provided with feeders (not shown) for the continuous flow of particles into and out of the vessel at the same rate so that a bed of particles is formed in the reactor. The top of the bed will normally be lower than the top of the reactor. If desired, the vessel may be provided with a conventional jacket (not shown) for temperature control purposes.

The intermediate section 214 is generally tubular (preferably cylindrical) and merges into the generally converging (normally conical) bottom section 16.

According to the present invention, a means is provided for introducing fluid into the vessel (fluid distributing member or members) such that the uniformity of the fluid flow is improved without hindering the uniformity of the gravity plug flow of the particulate material. An examination of Darcy's equation for fluid flow through porous media reveals that the pressure drop is proportional to the product of the superficial velocity and the path length of the fluid flow. Thus improved uniformity of flow is obtained by improved uniformity of the path length for the fluid flow through the particulate material. To this end, the fluid distributing member or members communicating with fluid inlets 23, 24 and 25 will have sides steep enough for the mass flow of particles by gravity and are provided with an open area at their bottom so the fluid will be discharged substantially downward in the direction of particle flow. This design provides no cavity or surface for the accumulation of fines, gives good uniformity of path length for the fluid flow, allows mass flow of the particulate material and is a simple, inexpensive fabrication.

Figure 2:
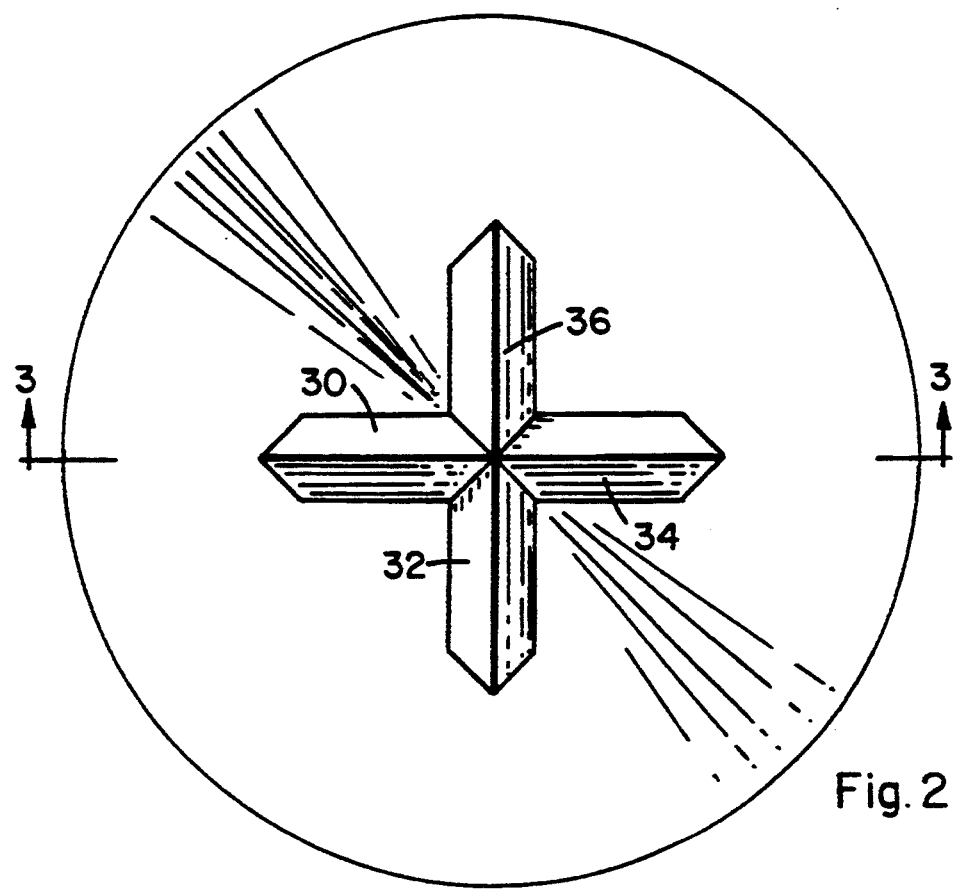
FIG. 2 is a section view of the vessel shown in FIG. 1 taken along line 2—2 of FIG. 1.
Figure 4:
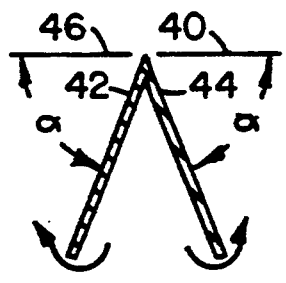
FIG. 4 is a section view taken along line 4—4 of FIG. 3.
Figure 5:
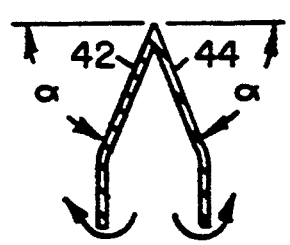
FIGS. 5 and 6 are section views similar to FIG. 4 showing modifications of the present invention.
Figure 6:
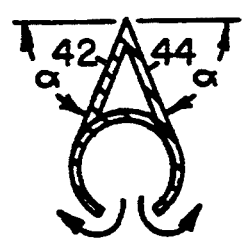

The cross-section for such members is preferably of a generally inverted V-shape (FIGS. 4, 5, and 6.) The actual shape of the fluid distributing member or members is obtained by translating a cross-section of the preferred shape along one or more axes that are substantially horizontal. One embodiment is shown in FIGS. 1 and 2 as two, horizontal intersecting members spanning the vessel interior at right angles near the bottom. Rotating a cross-section of the preferred shape about an axis that is substantially vertical, results in the embodiments shown in FIGS. 7 to 10. The fluid distributing members may be located anywhere along the height of the reactor but are preferably positioned near the bottom of section 14 or in section 16, most preferably, low in the bottom section 16 provided the fluid flow rate does not cause fluidization of the bed.

The fluid distributing members are positioned such that the apex of the V is upward in the vertically disposed vessel, i.e., the apex is pointed directly vertical so that both of the sides 42 and 44 make an angle "a" of between about 65 and about 85 degrees with a horizontal line 46. The preferred angles, designated "a", will vary according to the characteristics of the particles in the vessel. That is, properties such as shape, size, propensity to agglomerate (such as powder), stickiness, etc., should be considered and the angles chosen for the mass flow of the particles. For example, for the solid state polymerization of polyethylene terephthalate, angles "α" are preferably about 70 to about 75 degrees. It is preferred that the apex be nearly a knife-edge, but this is not required.

The angles "α" are chosen for mass flow of particles in the vessel and along the intersection of members with each other or the vessel wall. Mass flow is defined as movement of particles through a vessel such that generally all of the contents of the vessel are in motion. Consequences of this type flow are that product is in motion relative to vessel walls and internals, and in the normal case of a symmetrical flow channel or (as in the case of the vessel described herein) multiple, identical, symmetrical channels, product velocity at any point in a horizontal plane is generally the same and particles discharge from the vessel generally in the order in which they entered the vessel. Ideally, there are substantially no stagnant regions and all particles experience the same range of conditions moving from inlet to discharge. In reality, short periods of stagnation may occur, and it may take 10-20 hours for a particle to pass through the vessel, making it appear that little or no movement is occurring.

Mass flow will occur when channel walls are steep enough and smooth enough to accommodate the kinematic angle of friction between the flowing solid and the channel wall, and the effective angle of internal friction of the solid itself at that point. In other words, for a given product, in a vessel of a given material of construction and surface finish, there is a critical angle or wall steepness above which mass flow will occur.

Particles being treated in the vessel may be of any conventional size and shape. Shapes may be spherical, cubical, cylindrical, shapes such as described in U.S. Pat. No. 5,145,742, etc. Although size is not important, the particles should not be small enough to show a tendency to cake. Normally, in the solid state polymerization of polyethylene terephthalate, sizes will be at least $2 \times 2 \times 2$ mm, and not over about $9 \times 9 \times 9$ mm.

The fluid entering the vessel will normally be an inert gas such as, for example, nitrogen. The gas, however, may be reactive, depending on the treatment being given to the particles. The gas may be heated, cooled, or at room temperature as desired, with any desired flow rate usually below that which would cause fluidization of the particles.

Figure 3:
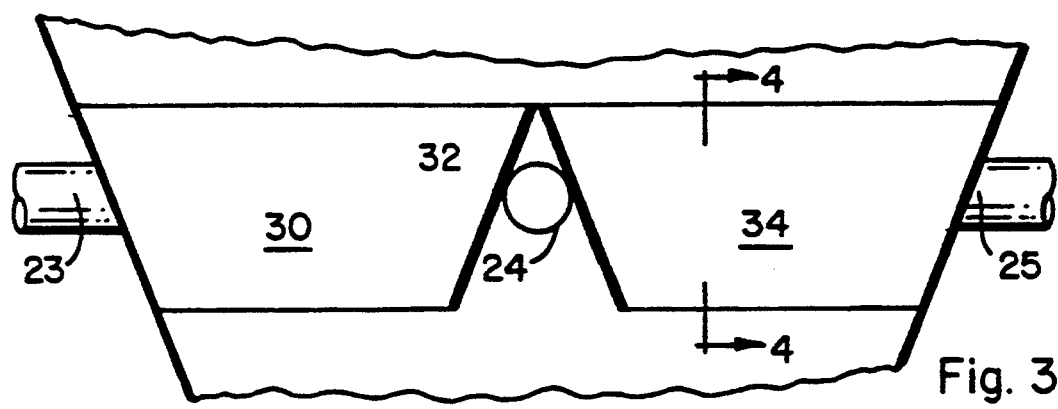
FIG. 3 is an enlarged partial elevation section view of the vessel shown in FIG. 1 taken along line 3—3 of FIG. 2 illustrating the fluid deflector in the vessel according to the invention.

The vessel according to the present invention is especially suitable for use as a solid state reactor or heat exchanger for polyester such as polyethylene terephthalate and copolymers thereof. Especially preferred is an embodiment having two horizontally disposed intersecting manifolds crossing the vessel at right angles, as shown in FIGS. 1-3.

Figure 7:
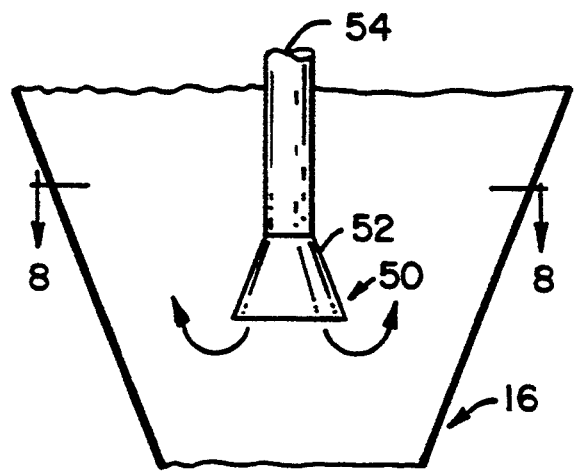
FIGS. 7 and 9 are similar to FIG. 3, and
FIGS. 8 and 10 are similar to FIG. 2.
Figure 8:
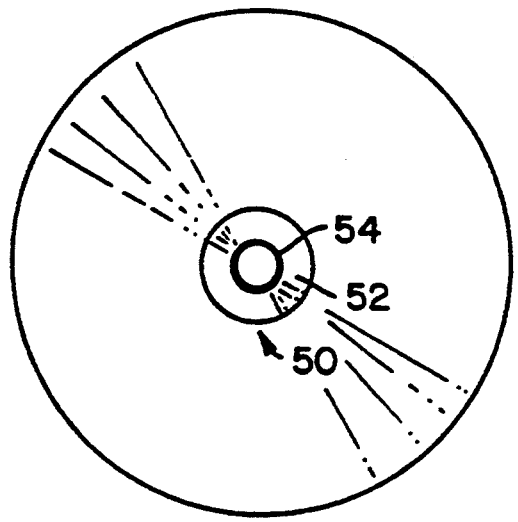
Figure 9:
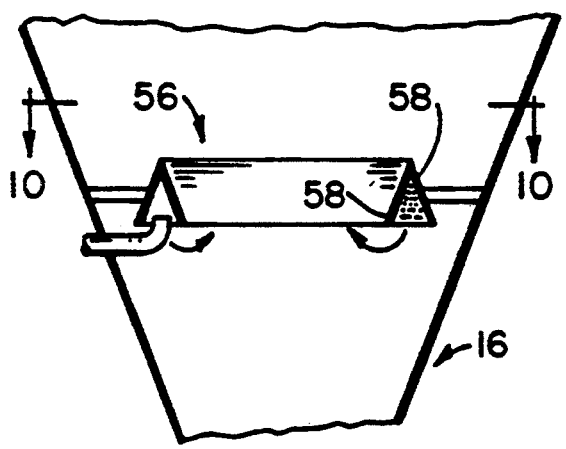
Figure 10:
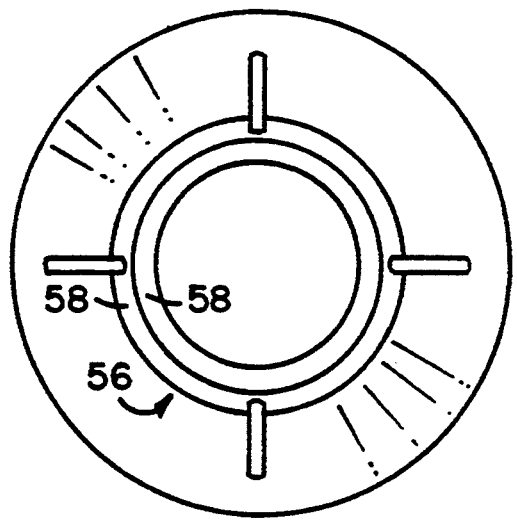

FIGS. 7-10 illustrate different embodiments of the invention. In FIGS. 7 and 8, the vessel bottom section 16 is provided with a single, centrally located distributor 50, the sides 52 of which are sloped as described above. The fluid inlet is at 54. In FIGS. 9 and 10, a ring or circular distributor 56 having sloped sides 58 in accordance with this invention is illustrated. The present invention provides no cavity or surface for the accumulation of fines, gives good uniformity of path length for the gas and particle flow and allows for mass flow of solid particles.

As an example of the solid state polymerization of polyethylene terephthalate, polyester particles having an inherent viscosity (I.V.) of about 0.6, a size of $4 \times 4 \times 2$ mm and an OH:COOH end group ratio of 6.3:1, are charged from a silo to a mixer equipped with agitating blades and jacket-heating. The particles are heated in a continuously operating mixer and then crystallized in conjunction with a continuous nitrogen sparge at a nitrogen to granulate weight ratio of 2:1. The particles are then continuously fed, under an airtight seal; to a vertical, jacket-heated, tubular reactor as shown in the drawings and as described herein where it forms a bed. Nitrogen at a weight ratio of nitrogen to granulate of 2:1 and at a temperature of about 200° C. is passed in countercurrent flow through the particulate bed. After a solid state polycondensation time of 8 hours, the final granulate having an I.V. of about 0.7 emerging from the tubular reactor.

I.V. is measured at 25° C. using 0.5 g of polymer per 100 mL of a solvent consisting of 60% by weight phenol and 40% by weight tetrachloroethane.

The invention has been described in detail with particular reference to preferred embodiments thereof, but it will be understood that variations and modifications can be effected within the spirit and scope of the invention.

We claim:

1. A substantially vertically disposed tubular reactor for the continuous gravity plug flow solid state polymerization of low molecular weight polyester resin particles to high molecular weight polyester resin, said reactor comprising a continually downwardly flowing column of polymerizing polyester resin maintained at an essentially constant level by the continuous addition of low molecular weight polyester resin to the reactor at a rate essentially equivalent to the rate of continuous withdrawal of high molecular weight polyester resin from the reactor, said reactor further comprising (a) a top section having an fluid outlet and a low molecular weight polyester resin inlet to allow continuous addition of said resin to said reactor,
   (b) an elongated tubular intermediate section fixed to and cooperating with said top section for the uniform plug flow of polyester resin particles therethrough by gravity,
   (c) a converging bottom section fixed to and cooperating with said tubular section, and having a high molecular weight polyester resin outlet to permit continuous withdrawal of said resin from said reactor,
   (d) means for introducing inert fluid into said reactor for countercurrent flow with respect to said polyester resin particles, and
   (e) means for improving the uniformity of said inert fluid flow through said reactor without hindering plug flow of the particulate polyester resin material, said means comprising
      (1) at least one inert fluid inlet in said reactor and a generally horizontally extending fluid distributor extending therefrom for the introduction of inert gas into said vessel, said fluid distributor having a polyester particle deflector portion and a fluid discharge portion, the particle deflector portion being sloped relative to the gravity flow of polyester resin particles such that mass flow of said particles will occur and the fluid discharge portion having at least one opening positioned to discharge fluid substantially horizontally or at an angle between substantially horizontal and the direction of flow of polyester resin particles.

2. A the vessel according to claim 1, wherein said bottom section is provided with a plurality of said fluid distributors.

3. A vessel according to claim 1, wherein the sides of said fluid distributor are fixed at an angle of between about 65 and about 85 degrees from the horizontal.

4. A vessel according to claim 1, wherein the shape of said distributor is defined by translating its cross section along one or more generally horizontal axes or by rotating its cross section about a generally vertical axis.

* * * * *